May 23, 1967 S. F. DUNCAN 3,321,345
METHOD FOR MANUFACTURING A PLEATED AIR FILTER CARTRIDGE
Filed April 13, 1962 2 Sheets-Sheet 1
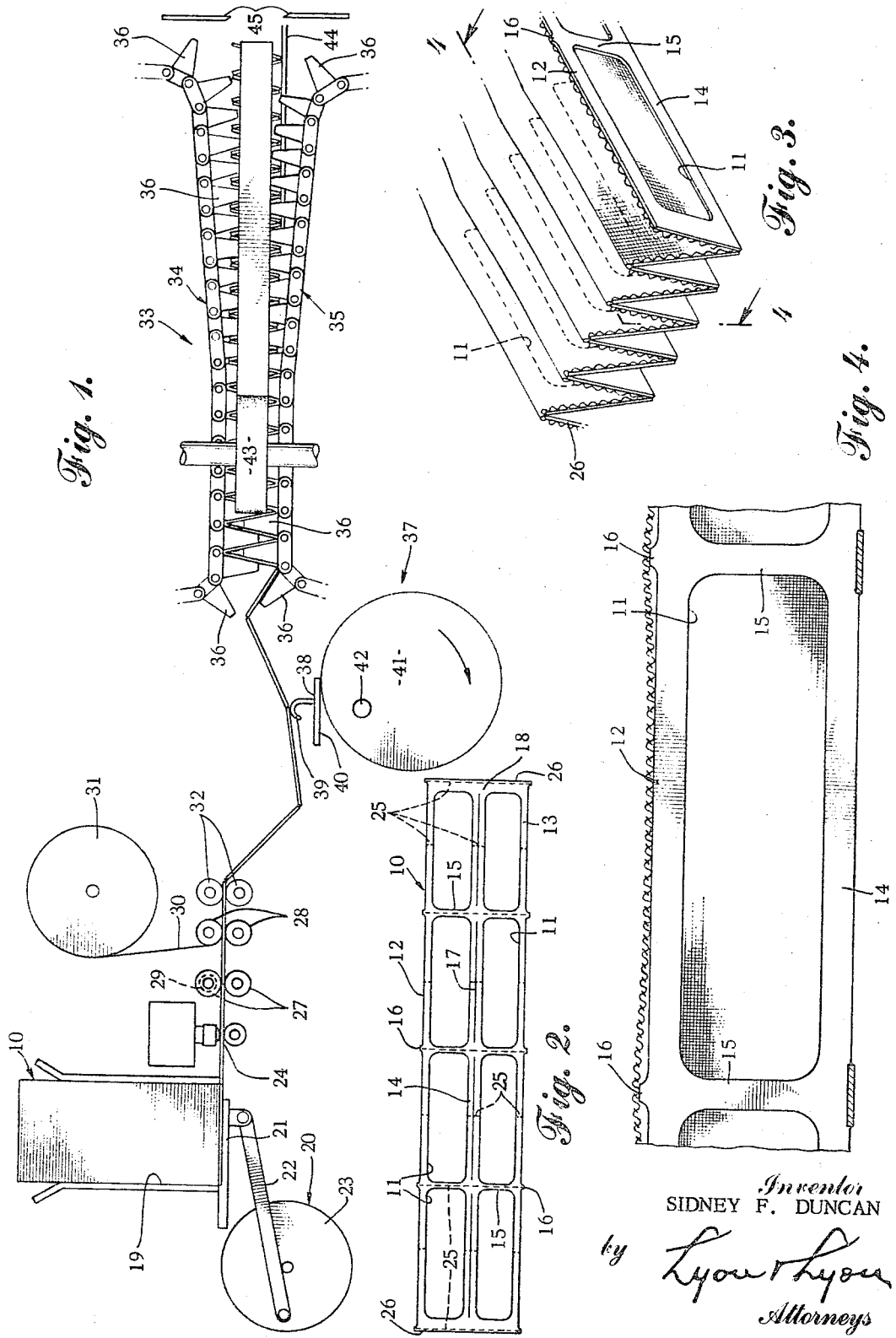
Inventor
SIDNEY F. DUNCAN
by Lyon & Lyon
Attorneys

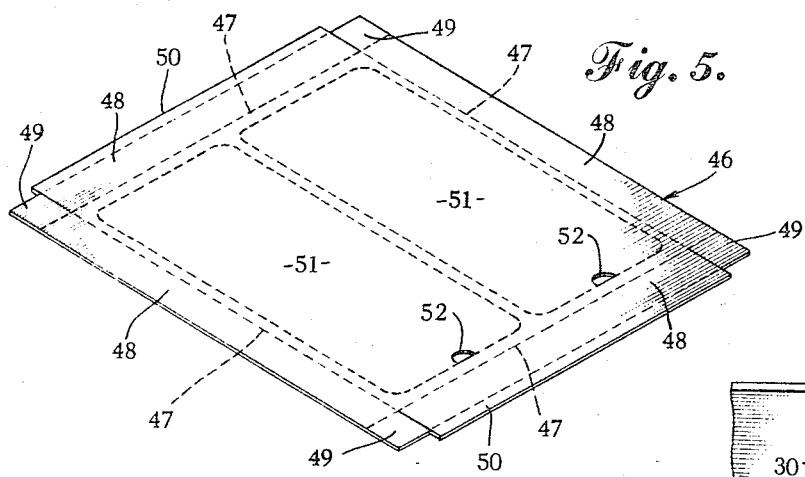
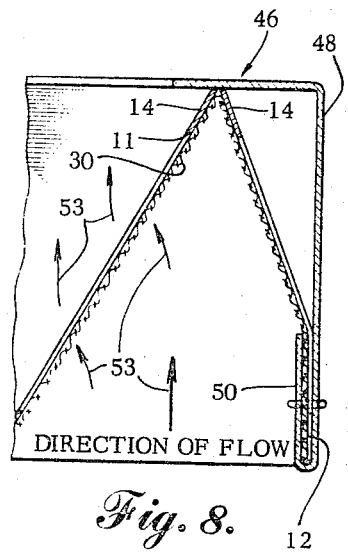
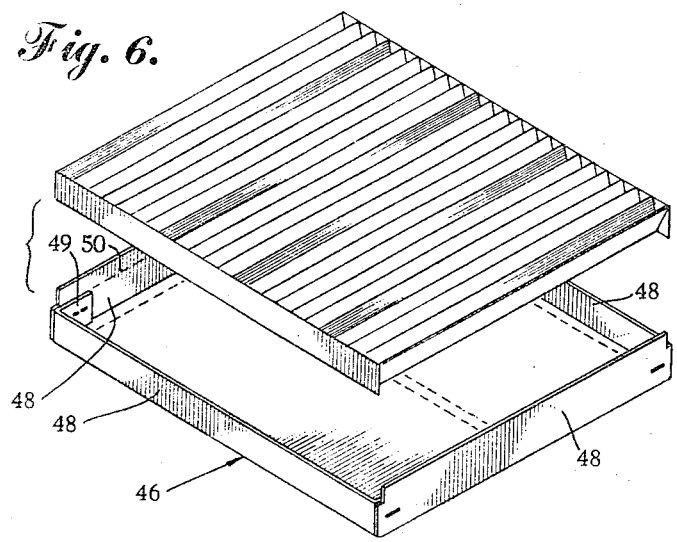
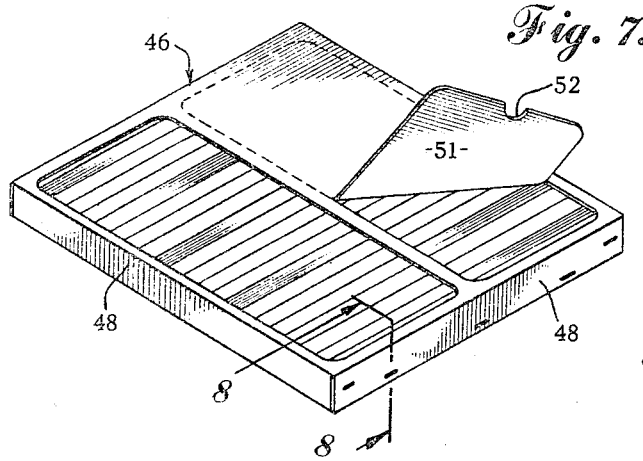

3,321,345
METHOD FOR MANUFACTURING A PLEATED AIR FILTER CARTRIDGE
Sydney F. Duncan, Torrance, Calif., assignor to Farr Company, El Segundo, Calif., a corporation of California
Filed Apr. 13, 1962, Ser. No. 187,264
7 Claims. (Cl. 156—91)

This invention relates to a method of making air filters used in removing foreign materials from air entering an inlet duct to an air conditioning system or other type of air supply system and, in particular, is directed to an economical and practical method of making a self-contained air filter cartridge which is sufficiently inexpensive in its manufacture to be entirely disposable after use.

In most air conditioning and air supply systems, it is generally desirable to filter some of the foreign materials such as dust or dirt particles out of the air which is being supplied to the system. The amount of foreign material which is tolerable in the particular air conditioning or supply system will dictate the particular type of filtering media which must be used. If relatively fine dust particles must be removed from the incoming air the filter media must normally consist of such materials as cloth-backed cotton, polyurethane foam, glass-coated cloth, spun nylon, and the like. The foreign material extracted from the incoming air accumulates and the filtering media eventually becomes sufficiently clogged or loaded with dirt that its resistance to air flow becomes excessive. When this occurs, the media must be either replaced or cleaned. With most types of filtering media which are effective for removing fine dust particles, it is impractical to clean the same and it therefore has become relatively common to use inexpensive disposable filter cartridges.

Filtering materials which provide reasonable efficiencies in the removal of the relatively finer foreign particles have relatively high resistance to the flow of air therethrough, and therefore it is common practice to corrugate or pleat the filtering media thereby increasing the area of filtering media through which the air may flow. Most of these types of filtering media are not sufficiently rigid to be self-supporting in this corrugated or pleated configuration, with the result that some apparatus must be supplied to support the filtering media. While various expedients have been used to provide this support, including wire baskets, rigid frameworks which carry supporting wires and the like, the least expensive and most widely used have been various cardboard members used as a frame work to support the filtering media in a self-contained cartridge. Many of such cartridges, however, have certain objectionable features. For example, the cardboard support is such that the adjacent pleats of media are flexed by the air stream so as to cling one to the other thereby reducing the effective area of filtering material available for air to pass through. To partially avoid this, it is necessary that the space between the pleats and/or the angle between the pleats must be relatively large thereby restricting the area of filtering material.

One self-contained filtering cartridge which overcomes many of these objectionable features of other cartridges is illustrated, described and claimed in the concurrently filed patent application Ser. No. 188,634 of Kenneth W. De Baun, entitled Pleated Air Filter Cartridge, now Patent No. 3,246,457, and is also illustrated and described in this application. My invention is directed to a method of making a disposable self-contained filtering cartridge of the type shown in this application and in the above-mentioned concurrently filed application. In order for a filtering cartridge to be sufficiently inexpensive to be disposable after replacement, the materials used must be inexpensive, the quantity of materials minimized, and the manufacture of the cartridge must be relatively rapid and inexpensive.

In the above-mentioned concurrently filed application the self-contained filtering cartridge is constructed generally of a cardboard frame with a multiplicity of apertured support strips folded into a V-shape and mounted side by side in the frame with a filtering material secured to one side of the support strips and conforming to the V-shape. Since the support strips form the pleats of the filtering material there is ample support for the filtering material when it is properly secured to the support strips which is not found in many other types of self-contained filtering cartridges. However, for this self-contained filtering cartridge to be most effective and sufficiently ridged for practical use, it must be properly glued and assembled. Furthermore, while this filtering cartridge could be completely manually glued and assembled, the cost of production would be prohibitive to warrant selling the cartridge at a price sufficiently low to allow disposal of the cartridge after use.

In accordance with the present invention, there is provided a method for making a self-contained filtering cartridge of the type disclosed in the above-mentioned concurrently filed application which is relatively rapid and automated and produces a structurally sound and inexpensive filtering cartridge.

Accordingly it is a principal object of this invention to provide a method for making a self-contained, disposable pleated air filtering cartridge wherein the steps for making may be performed inexpensively.

Another object of this invention is to provide a novel method for making a form of disposable pleated filter cartridge wherein the filtering media is secured to supporting media prior to pleating in such manner as to form a structurally strong filter by pleating the assembly and retaining same in pleated relationship.

A more detailed object of this invention is to provide a method of making a pleated disposable filter cartridge having a plurality of individual apertured cardboard strips which are secured to the filtering material and folded longitudinally to effectively support each pleat.

Another and specific object of this invention is to provide a method of forming a self-contained disposable pleated filtering cartridge wherein the filtering material is secured to supports and pleated completely automatically before being assembled in the cartridge frame.

Other and more detailed objects and advantages of this invention will appear from the following description and the accompanying drawings.

In the drawings:

FIGURE 1 is a schematic elevation view of the apparatus and method of this invention for applying filtering material to support strips and pleating the combination.

FIGURE 2 is a plan view of one of the support strips prior to assembly.

FIGURE 3 is a fragmentary perspective view of the assembled and pleated filtering material and support strips.

FIGURE 4 is a sectional elevation view taken substantially on the line 4—4 as shown in FIGURE 3.

FIGURE 5 is a perspective view of the frame of the filtering cartridge prior to assembly.

FIGURE 6 is an exploded view illustrating the pleated filtering material and support strips ready to be installed in the assembled frame of the cartridge.

FIGURE 7 is a perspective view of the assembled pleated filtering cartridge from the reverse side as the side shown in FIGURE 6, and with one tear-out panel removed and the other tear-out panel partially removed.

FIGURE 8 is a sectional elevation view taken substantially on the line 8—8 as shown in FIGURE 7.

Referring now to the drawings, the pleated air filter cartridge of the above-mentioned concurrently filed patent application is shown and described in detail in order to fully illustrate and describe the method of this invention for making the cartridge. A plurality of support strips, generally designated 10, are provided for supporting the filtering media in the pleated configuration. The support strips 10 are hereinafter described as being constructed of cardboard. As used herein, the term "cardboard" is intended to include such inexpensive materials as chipboard, paperboard, cardboard, or certain plastic materials which can be scored and folded in accordance with the method hereinafter described.

Each support strip is preferably die cut from relatively thin cardboard or chipboard. A plurality of apertures 11 (eight of which are cut in the strip illustrated in FIGURE 2) are cut out of each support strip leaving a pair of longitudinal edge ribs 12 and 13 and a longitudinal central rib 14. The edge ribs 12 and 13 are each joined to the central rib 14 by lateral ribs 15. Thus, it will be seen that a portion of either edge rib 12 or 13, a portion of the central rib 14, and a pair of lateral ribs 15 form each aperture 11. Each of the edge ribs 12 and 13 are provided with a number of protuberances 16 projecting from the side of the edge rib at a location adjacent each lateral rib 15. The central rib 14 is cut longitudinally and intermittently along its length as shown by line 17 for ease of folding as hereinafter described. In between the longitudinal cuts 17 the central rib 14 is cut-scored on the back side (the side opposite the front side 18 shown in FIGURE 2) part way through the material to further facilitate the longitudinal folding of the support strip 10.

Referring now more particularly to FIGURE 1, an apparatus is schematically shown for performing the method of assembling the filter media and the support strips and folding the assembly, although it is to be understood that the apparatus shown could be materially modified or different apparatus substituted for accomplishing the same steps of my method without departing from my invention. The support strips 10 may be stacked one on top of another in hopper 19 and ejected one at a time from the hopper 19 by a feeding apparatus 20. The feeding apparatus 20 has an ejector plate 21 adapted to engage a single support strip and which is reciprocated by the link arm 22 eccentrically mounted on the rotatable wheel 23. The support strips 10 then pass laterally through gluing rolls 24 where glue is applied to the front side 18 of the strip in a number of lateral stripes as illustrated by dotted lines 25 as shown in FIGURE 2. While it is preferable that a continuous stripe 25 of glue is applied along the lateral ribs 15 at each end 26, it is not essential that a continuous stripe be applied on the intermediate lateral ribs 15 or on the edge ribs 12 or 13 at locations intermediate the lateral ribs 15. It has been found that it is sufficient to apply glue merely on the central rib 14 at locations adjacent the lateral ribs 15 and at a midpoint between each pair of lateral ribs 15. However, since the additional unnecessary glue on lateral ribs 15 and edge ribs 12 and 13 is not detrimental to my method or to the construction and is merely a consequence of applying the glue in continuous stripes by rolls 24, I do not attempt to prevent the application of glue to these points by the gluing rolls 24. The significance of this particular location of stripes of glue will be hereinafter pointed out in connection with the description of the use of the filter cartridge.

The support strips 10 are advanced from left to right in the apparatus of FIGURE 1 by virtue of each support strip engaging the previously ejected support strip and the pulsating feeding of the support strips by apparatus 20. The protuberances 16 on each edge rib 12 engage the like protuberances 16 on the edge rib 13 of the next adjacent support strip 10. Thus it will be seen that the edge ribs 12 and 13 of adjacent support strips are slightly separated (by twice the distance of projection of each protuberance 16) as the support strips progress through the apparatus of FIGURE 1. The support strips 10 then progressively pass through feed rolls 27 which rotate continuously to change the pulsating feeding of the strips by the apparatus 20 to a continuous feeding to feed rolls 28. The upper feed roll 27 is annularly grooved as at 29 to miss the glue applied by gluing rolls 24. The support strips 10 continuously pass between feed rolls 28 as the sheet-type filtering material 30 is continuously drawn off the roll 31 and applied to the glued or front side 18 of the support strips by the feed rolls 28. With the support strips 10 secured to the filtering material 30 the assembly may pass through one or more pairs of pinch rolls 32 for applying the necessary pressure to assure the proper gluing as well as for positioning the continuous sheet of assembled filtered material and support strips for the next operation. Here it may be seen that the assembled material and support strips may be rolled onto a roll for storage pending further use or directed immediately into the folding operation as hereinafter described.

The assembled filtering material and support strips may be fed directly from pinch rolls 32 or from a roll of assembled filtering material and support strips into the folding apparatus illustrated in FIGURE 1 and generally designated 33. The folding apparatus 35 may include a pair of roller chain assemblies 34 and 35 mounted in spaced relationship one from the other and mechanically driven at the same rate of linear advancement by any convenient mechanical means (not shown). A blunt pointed pyramidal-shaped bar 36 is mounted on each link of the roller chain assemblies 34 and 35. As the roller chain assemblies 34 and 35 advance from left to right, as viewed in FIGURE 1, and the assembled filtering material and support strips are fed from left to right into the apparatus, each support strip is folded by the bars 36 along the longitudinal central rib 14 at cut portion 17 of the rib. Each bar 36 associated with assembly 34 fits between the folded halves of a single support strip, and each bar 36 associated with assembly 35, fits in between adjacent folded support strips 10 to maintain proper positioning during the heretofore described folding and subsequent operations.

A cam operated ram assembly, generally designated 37, is provided for supporting and properly positioning the assembled support strips and filtering material immediately in front of the chain assemblies 34 and 35. The ram 38 of the assembly 37 has a curved supporting surface 39 and a cam following surface 40. The ram 38 is mechanically supported by any convenient means (not shown) for movement up and down by cam 41. Cam 41 may be circular cam eccentrically and rotatably mounted by shaft 42. The rotation of cam 41 is synchronized with the movement of chain assemblies 34 and 35 for the proper feeding of the assembled support strips and filtering material to assemblies 34 and 35. It has been found preferable to position the ram 38 relatively close to where the bars 36 of assemblies 34 and 35 intermesh, such as about one and one-half times the width of one support strip, and to raise and lower the ram a distance about equal to the width of one support strip (both approximately as shown), although it is to be understood that other spacing and movement is also satisfactory. Further, it is preferred that a slack loop of assembled support strips and filtering material be provided between the pinch rolls 32 and the ram 38 (as shown) for accomplishing the proper feeding to apparatus 33.

A roll of tape 43 is rotatably mounted on each side of the apparatus 33 adjacent the ends 26 of the support strips. The continuous tape 43 is glued to the ends 26 of the support strips 10 while they are held in proper position by the roller chain assemblies 34 and 35 and this proper positioning is maintained by the tape when the bars 36 are withdrawn from between the support strips at the right hand end of the apparatus 33, as viewed in FIGURE 1. The tape 43 may be of the preglued type which is merely moistened before applying to the ends 26 or may be plain paper tape to which glue is applied just before applying to the ends 26. The chain assemblies 34 and 35 are sufficiently long to permit proper adhering of the tape 43 to the ends 26 before the bars 36 are withdrawn from the pleated assembly. The bars 36 are withdrawn by reason of the angular separating of assemblies 34 and 35 toward the right, as viewed in FIGURE 1. As the chain assemblies 34 and 35 separate the pleated, taped assembly of support strips and filtering material is supported by table 44. The folded and taped assembly forms a continous "stick" of filter which may then be chopped off to the desired length by any convenient means, such as shearing apparatus 45 for mounting in a frame hereinafter described.

Since the filtering material is applied to the support strips 10 while they are flat, folding the composite web of support strip and filtering material in apparatus 27 tends to elongate the filtering material at the folds made between adjacent support strips 10 by twice the thickness of the material of the support strips. At the folds made along line 17 no elongation takes place since the filtering material is on the inside of the fold. While some filtering materials could withstand the localized stretching along the entire length of the edge ribs 12 and 13 of adjacent support strips without seriously inhibiting the folding operation or destroying the filtering material, other filtering materials are not sufficiently elastic to permit this folding along an entire edge without appreciable damage to the support strips or the filtering material. I therefore prefer to provide the protuberances 16 which project a short distance, preferably greater than the thickness of the material of the support strips 10, so that upon folding there is sufficient loose filtering material between adjacent ribs 12 and 13 of adjacent support strips (in between the protuberances) so that there is no appreciable stretching of the filtering material at locations longitudinally between protuberances. The stretching forces are therefore localized at each of the protuberances 16 and in most filtering materials this individual localized stressing would not seriously inhibit the folding of the strips nor cause appreciable damage to the filtering material. The filtering material therefore assumes a configuration like or similar to that particularly illustrated in FIGURE 4 and also shown in FIGURE 3. This irregular configuration, however, is not illustrated in FIGURE 6 for simplicity of illustration of that figure. Further, it is to be noted that the various ribs and apertures of each support strip 10 would be visible in FIGURE 7 but have been omitted from that figure for clarity of illustration.

In the self-contained filtering cartridge of the above-mentioned currently filed patent application of De Baun means are provided for supporting the chopped-off stick of folded, taped filtering material and support strips and as shown in FIGURES 5, 6, 7 and 8, these means may include the frame generally designated 46. The frame 33 is hereinafter described as being constructed of cardboard but it is to be understood that the term "cardboard" is intended to include such inexpensive materials as chipboard, paperboard, cardboard or certain plastic materials which can be cut-scored and folded in the manner hereinafter described. The frame 46 may be constructed of a flat sheet of cardboard appropriately cut and cut-scored for folding to form a shallow box-type frame for receiving the stick of folded, taped filtering material and support strips. The cardboard of the frame 46 is cut-scored, partway through the material along the dashed lines 47 in order to facilitate folding the sides 48 up at 90° to the sheet of cardboard. The ears 49 on each end of two of the sides 48 are folded inwardly at 90° to those sides and secured to the remaining two sides 48 such as by staples, as shown. The stick of folded, taped assembly of support strips and filtering material cut to the proper length by shearing apparatus 45 is then placed within the frame 46 as shown in exploded view, FIGURE 6, with the filtering material 30 on the upper side of the assembly as depicted in FIGURE 6. Flap portions 50 on the two of the sides 48 are each folded over the support strips 10 adjacent that side 48 and secured thereto by any convenient means such as gluing and staples, as shown. The two strips of tape 43 on either end of the support strips are also glued to the sides 48 to further enhance the overall strength of the assembly. A pair of tear-out panels 51 are provided by cut-scoring the sheet of cardboard of frame 46 and providing finger-holes 52. After the assembly, as described, the tear-out panels 51 may be removed by gripping the panels at finger-holes 52 and progressively tearing the panels out of the frame 46.

The assembled frame 46, supports strips 10 and filtering material 30 forms the self-contained air-filtering cartridge which may be mounted in the air inlet duct (or frame thereof) of the air conditioning or air supply system. The air filtering cartridge is mounted in the air inlet duct such that the direction of flow of air is from the side of the support strips 10 on which the filtering material 30 is glued and away from the back side of the support strips 10 as shown by arrows 53 in FIGURE 8. The air flows through the filtering material and through apertures 11 of the support strips 10. Since the filtering material is glued at locations 25 as heretofore described as being at each lateral rib 15 and on the longitudinal rib 14 at each midpoint between each pair of lateral ribs 15, the filtering material 30 will not be urged through the apertures 11 by the flow of air. Without the glue positioned as indicated, it has been found that the filtering material will billow through the apertures 11 to such an extent that the filtering material will contact the filtering material billowing through the aperture 11 of the next adjacent support strip 10. If this latter condition were permitted, the effective filtering area of the filtering material would be greatly reduced.

Thus by my method a relatively inexpensive air filtering cartridge is mechanically produced, in part, which economically may be disposed of after the filtering material has become sufficiently clogged to be ineffective. Further, by my method a structurally strong self-contained filtering cartridge may be rapidly mass produced and yet has a high effective filtering area for the overall size of the cartridge.

Having fully described my invention, it is to be understood that I do not wish to be limited to the details herein set forth or to the details illustrated in the drawings, but my invention is of the full scope of the appended claims.

I claim:

1. A method for constructing a pleated filter of apertured cardboard support strips, a sheet of filter media, and tape comprising the steps of: applying glue to at least portions of one side of the support strips, positioning a plurality of support strips side by side and securing the filter media to the glued side of the strips; longitudinally folding each of the strips and physically-constraining the strips in that folded relation; and gluing the tape along the ends of the constrained strips for maintaining said strips in folded relationship upon release.

2. A method for constructing a pleated filter of apertured cardboard support strips, a sheet of filter media, and tape, comprising the steps of: applying glue to at least portions of one side of the support strips; positioning a plurality of support strips side by side and securing the filter media to the glued side of the strips; longitudinally folding each of the strips toward the filter media side and physically constraining the strips in that folded relation; and gluing the tape along the ends of the confined strips for maintaining same in folded relationship upon release.

3. A method for constructing a stick of pleated filter of cardboard support strips, a sheet of filter media, and tape, comprising the steps of: cutting and removing portions of the support strips to form apertures therethrough and cut-scoring part of the support strips; applying glue to at least portions of one side of the support strips; positioning a plurality of support strips side by side and securing the filter media to the glued side of the strips; longitudinally folding each of the strips along said cut-scored part toward the filter media side and physically constraining the strips in that folded relation; and gluing a tape along the ends of the confined strips for maintaining same in folded relationship upon release.

4. A method for constructing a pleated filter of apertured cardboard support strips, a sheet of filter media, and tape, comprising the steps of: applying glue to at least portions of one side of the support strips; positioning a plurality of support strips side by side and securing the filter media to the glued side of the strips; continuously feeding the glued support strips and filtering media and longitudinally folding each of the strips toward the filter medial side and physically constraining the strips in that folded relation; raising and lowering the glued support strips and filter media during the feeding for assisting in the longitudinal folding; and gluing a tape along the ends of the confined strips for maintaining same in folded relationship upon release.

5. A method for constructing a filter cartridge of apertured cardboard support strips, a sheet of filter media, and a cardboard frame, comprising the steps of: applying glue to at least portions of one side of the support strips, positioning a plurality of support strips side by side and securing the filter media to the glued side of the strip; longitudinally folding each of the strips toward the filter media side, physically constraining the strips in that folded relation, and gluing a tape along the ends of the constrained strips for maintaining said strips in folded relationship upon release; and mounting the taped, glued assembly of strips and filter media in said frame.

6. A method for constructing a filter cartridge of apertured cardboard support strips, a sheet of filter media, and a cardboard frame, comprising the steps of: applying glue to at least portions of one side of the support strips; positioning a plurality of support strips side by side and securing the filter media to the glued side of the strips; longitudinally folding each of the strips toward the filter media side, physically constraining the strips in that folded relation, and gluing a tape along the ends of the constrained strips for maintaining same in folded relationship upon release; gluing the ends of the strips and the tape to the frame, and stapling and gluing the outermost strips to the frame.

7. A method for constructing a filter cartridge of cardboard support strips, a sheet of filter media, and a cardboard frame, comprising the steps of: cutting and removing portions of the support strips to form apertures therethrough and cut-scoring part of the support strips; applying glue to at least portion of one side of the support strips; positioning a plurality of support strips side by side and securing the filter media to the glued side of the strips; longitudinally folding each of the strips along said cut-scored part toward the filter media side, physically constraining the strips in that folded relation, and gluing a tape along the ends of the constrained strips for maintaining same in folded relationship upon release; gluing the ends of the strips and the tape to the frame, and stapling and gluing the outermost strips to the frame.

References Cited by the Examiner

UNITED STATES PATENTS

| | | | |
|---|---|---|---|
| 1,907,601 | 5/1933 | Snyder | 156—211 X |
| 2,008,974 | 5/1935 | Weber | 156—302 X |
| 2,409,951 | 10/1946 | Nootens | 156—206 X |
| 2,556,011 | 6/1951 | Swayze et al. | 156—595 X |

EARL M. BERGERT, *Primary Examiner.*

J. J. BURNS, D. SCHWARTZ, *Assistant Examiners.*